July 11, 1939.  A. H. BLAND  2,165,743
AMUSEMENT DEVICE
Filed May 11, 1937
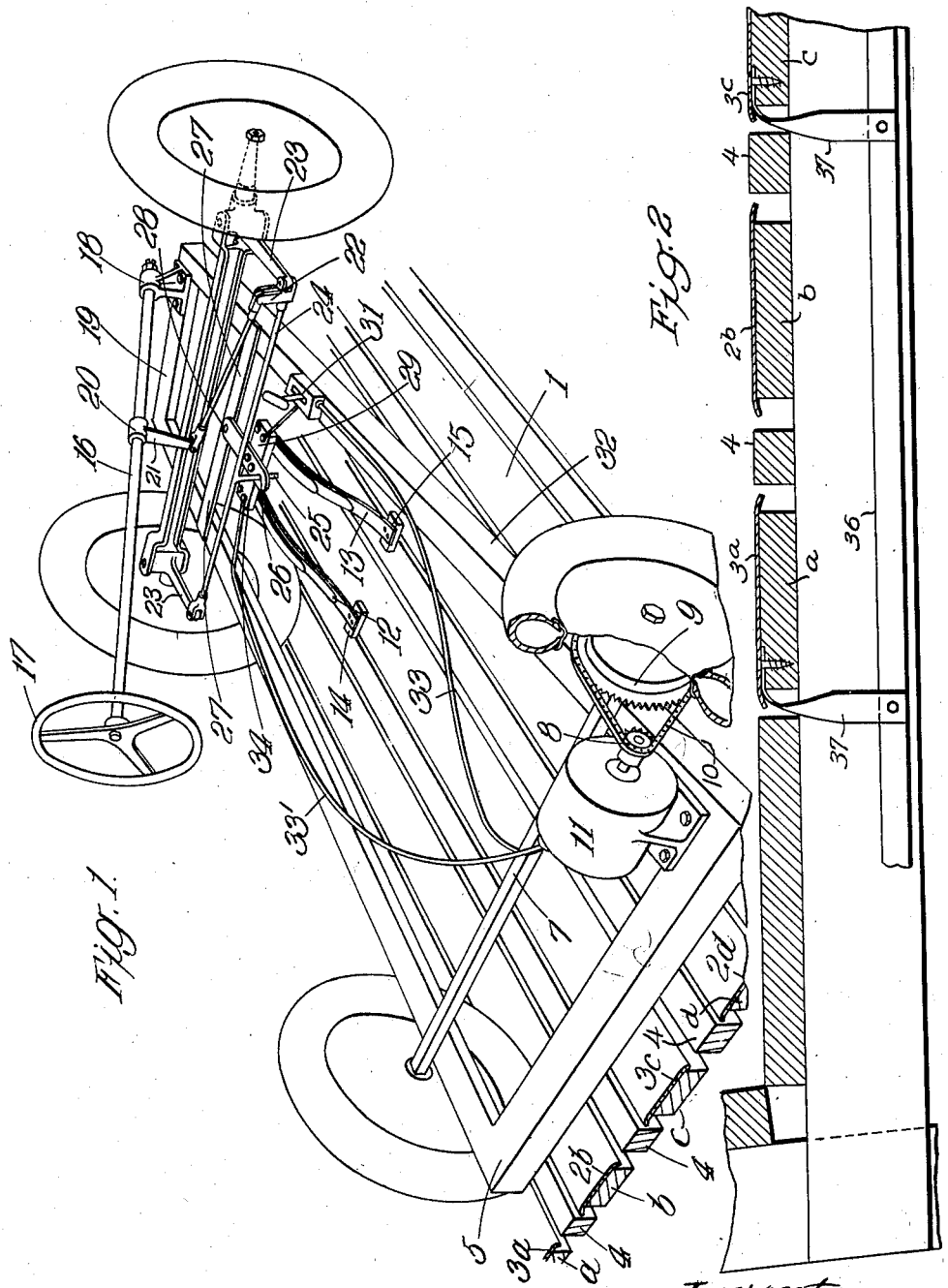
Inventor:
Arthur Henry Bland,
by Calvert Calvert,
Attorneys.

Patented July 11, 1939

2,165,743

UNITED STATES PATENT OFFICE 2,165,743

AMUSEMENT DEVICE

Arthur Henry Bland, Wembley, England

Application May 11, 1937, Serial No. 142,034
In Great Britain December 30, 1936

1 Claim. (Cl. 191—13)

This invention relates to tracks having conductors over which electrically propelled vehicles are adapted to travel for amusement purposes.

An object of the invention is to provide an improved construction and arrangement of the track so that water may readily drain away from the surface of the track.

Another object of the invention resides in a track structure wherein the conducting strips are arranged substantially in the same plane and having non-conducting strips arranged intermediate of the conductors so that the upper surface of all of the members forming the track will be in substantially the same plane.

A more specific object of the invention resides in providing the conducting strips with turned down edges to allow water to drain readily from the surfaces of the conducting strips.

The invention is illustrated in the accompanying drawing by way of example, Fig. 1 being a diagrammatic view, partly in section, of the chassis of an electrically propelled vehicle having means permitting of electric current for motive purposes being supplied from the track on which the vehicle travels. Fig. 2 is a section through a part of the track illustrating the mode of connecting a conductor with conductive strips of the track.

Referring to the drawing, I denotes collectively a track constructed according to the invention and adapted to supply electric current to a vehicle adapted for propulsion along the track.

As shown, the track is built of spaced floor boards $a, b, c, d, e \ldots$ covered with spaced strips of suitable conducting material. Assuming that a direct current supply is employed, alternate strips may be used to supply positive current and intermediate strips to provide return paths. The strips $2b, 2d \ldots$ are for instance conducting strips supplying, say, positive current, and for that purpose are connected to a suitable electric supply means, while the strips $3a, 3c, 3e \ldots$ are conductive strips providing a return path. The strips may be connected with an alternating current supply.

To prevent short circuiting occurring due to water collecting on the surface of the track, for instance, when the track is erected in the open air and not protected by overhead awnings, the conducting strips are suitably bent downwardly along their respective margins, any water falling on the track thus being allowed to drain away to suitable channels which may be provided beneath the floor or directly on to the ground beneath the floor. Intermediate and spaced from each positive and negative conductive strip may be provided uncovered wooden boards or strips of insulating material 4 so arranged that the upper surfaces thereof lie in the same plane as the upper surfaces of the conductive strips $2b, 3a$, etc., thus providing a substantially flush track surface.

The vehicle illustrated adapted for propulsion along the track includes a chassis, the frame of which is denoted as 5, mounted on front and rear axles 6 and 7 carried by the wheels of the vehicle. Mounted on the chassis frame 5, preferably at the rear thereof, and in driving connection with the rear axle 7 through sprockets 8 and 9 and a chain 10 or other driving means, is an electric motor 11, which may be a series wound motor.

For supplying current to the motor 11 from the track, there are mounted on the chassis resilient members 12 and 13 to the lower ends of which are rigidly attached brushes 14 and 15 adapted for sliding contact with the conductive strips $2b$, $2d \ldots$ and $3a, 3c, 3e \ldots$ constituting the track, the contact members being spaced so that the mid points of the brushes are a distance apart equivalent to the distance between the mid points of adjacent positive and negative conductive strips. The brushes 14 and 15 are of a width slightly less than the width of the non-conductive strips 4 so that a brush will not contact with adjacent conductive strips and result in short-circuiting.

The contact members 12 and 13 are connected with the steering mechanism of the vehicle in such manner that on turning of the steering wheel the contact members sweep the floor beneath the vehicle, so that, in the event of loss of contact of the contact members with the conductive strips of which the floor is composed contact may be restored by turning the steering wheel.

With this object in view, the steering shaft 16, to which is secured the usual steering wheel 17 is rotatably mounted in a socket member 18 rigidly attached to a cross member 19 of the vehicle chassis, and intermediate the ends of the steering shaft is mounted a collar 20 integral with an arm 21 to which is pivotally attached a drag link pivoted to a bracket 22 on a steering arm 23. To the tie rod 24, connecting the steering arms 23, is attached a depending pin 25 which extends freely through a hole in an arm 26, which, as shown in Fig. 1, is pivoted at 28 to a cross member 27 of the chassis frame, said cross member 27 being separate from the cross member 19 on which the steering rod or shaft is mounted. As will be seen, displacement of the steering arms 23, due to the turning of the steering wheel 17, in addition to moving the front wheels of the vehicle, moves the plate 29 laterally in a curved path. Thus, on a pivotal movement of the arm 26 about its pivot 28, due to a turning of the steering wheel, the brushes 14 and 15 swing laterally in a curved path across the conductive strips of the track, the movement of said brushes being of greater extent than the movement of the tie rod 24. This greater movement of the brushes 14 and 15 is due to the fact that the brushes are located much further from the pivotal point 28 than the operating pin 25 moving with the rod 24.

As will be understood, the bevelling of the edges of the conductive strips, as already described, in addition to providing means for rapid draining of water from the track, serves also for ease in movement of the brushes attached to the contact members over the conductive strips and prevents the brushes being caught in the spaces between the strips.

Running beneath and transversely of the track to connect alternative conductive strips are conductors part of one of which is illustrated in Fig. 2. As shown, the conductor is in the form of a metal strip 36 and is connected to alternate conductor arms 37, bolted to the conductor 36 and lapped under the conductive strips, the conductive strips and the underlapping portion of the conductor arms being screwed down on to the supporting floor boards $a$, $b$.

In the use of a track such as illustrated several vehicles may be employed according to the dimensions of the track.

It will be appreciated that a track according to the invention can be constructed for erection on any ground space of adequate size, while also the track can be a permanent or a portable structure and provided with fittings such as awnings which are usual in amusement devices of this nature.

I claim:

A track for an amusement device of the kind specified comprising spaced-apart electrically conducting strips and non-conducting strips spaced apart from and interposed between said conducting strips, said conducting strips having turned-down edges to allow water to drain readily from the surfaces of said strips into the spaces separating conductive and non-conductive strips and the tops of said conductive and said non-conductive strips lying substantially in the same plane.

ARTHUR HENRY BLAND.